(12) United States Patent
Li et al.

(10) Patent No.: US 10,795,044 B2
(45) Date of Patent: Oct. 6, 2020

(54) DOWNHOLE, REAL-TIME DETERMINATION OF RELATIVE PERMEABILITY WITH NUCLEAR MAGNETIC RESONANCE AND FORMATION TESTING MEASUREMENTS

(71) Applicant: HALLIBURTON ENERGY SERVICES, INC., Houston, TX (US)

(72) Inventors: Lilong Li, Houston, TX (US); Songhua Chen, Katy, TX (US); Abdolhamid Hadibeik, Houston, TX (US); Sami Eyuboglu, Houston, TX (US); Waqar Ahmad Khan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 266 days.

(21) Appl. No.: 16/063,212

(22) PCT Filed: Feb. 22, 2018

(86) PCT No.: PCT/US2018/019182
§ 371 (c)(1),
(2) Date: Jun. 15, 2018

(87) PCT Pub. No.: WO2018/182884
PCT Pub. Date: Oct. 4, 2018

(65) Prior Publication Data
US 2020/0209426 A1    Jul. 2, 2020

Related U.S. Application Data

(60) Provisional application No. 62/480,328, filed on Mar. 31, 2017.

(51) Int. Cl.
*G01V 3/32* (2006.01)
*G01V 3/38* (2006.01)

(52) U.S. Cl.
CPC . *G01V 3/32* (2013.01); *G01V 3/38* (2013.01)

(58) Field of Classification Search
CPC .................................. G01V 3/32; G01V 3/38
(Continued)

(56) References Cited

U.S. PATENT DOCUMENTS

| 5,743,334 A | * | 4/1998 | Nelson | E21B 49/008 |
| | | | | 166/250.07 |
| 8,471,559 B2 | | 6/2013 | Taherian et al. | |

(Continued)

OTHER PUBLICATIONS

Them, Holger, et al. "Towards a Robust Estimation of Permeability by Integrating Logging Data from Nuclear Magnetic Resonance, Acoustic, and Formation Tester." SPE Annual Technical Conference and Exhibition. Society of Petroleum Engineers, 2016. (Year: 2016).*

(Continued)

*Primary Examiner* — Christopher P McAndrew
(74) *Attorney, Agent, or Firm* — Gilliam IP PLLC

(57) ABSTRACT

A method and system for downhole, real-time determination of relative permeability with nuclear magnetic resonance and formation testing measurements is provided. The method includes introducing a nuclear magnetic (NMR) tool and a formation testing tool into a well bore penetrating a subterranean formation. The method also includes measuring a saturation of a fluid in the subterranean formation from the NMR tool, measuring a mobility of the fluid from the formation testing tool, and measuring a viscosity of the fluid. The method includes calculating a relative permeability of the subterranean formation based on the measured saturation, the measured viscosity and the measured mobility. The method also includes providing a reservoir production prediction metric based on the calculated relative permeability of the subterranean formation for facilitating a well completion operation in the wellbore.

20 Claims, 6 Drawing Sheets

(58) Field of Classification Search
USPC .......................................................... 324/303
See application file for complete search history.

(56) References Cited

U.S. PATENT DOCUMENTS

| | | | |
|---|---|---|---|
| 8,720,552 B2 | 5/2014 | Ayan et al. | |
| 9,051,822 B2 | 6/2015 | Ayan et al. | |
| 10,527,748 B2 | 1/2020 | Li et al. | |
| 2004/0055745 A1 | 3/2004 | Georgi et al. | |
| 2005/0007109 A1 | 1/2005 | Thomann et al. | |
| 2010/0050762 A1* | 3/2010 | Nold, III | E21B 49/088 73/152.51 |
| 2012/0065888 A1 | 3/2012 | Wu et al. | |
| 2012/0092007 A1* | 4/2012 | Li | G01F 17/74 324/306 |
| 2012/0253679 A1* | 10/2012 | Chang | E21B 49/088 702/11 |
| 2013/0071934 A1* | 3/2013 | Indo | G01N 33/287 436/28 |
| 2014/0318232 A1 | 10/2014 | Pairoys | |
| 2015/0054503 A1* | 2/2015 | Chen | G01V 3/32 324/303 |
| 2015/0061669 A1* | 3/2015 | Hakimuddin | G01R 33/28 324/309 |
| 2017/0044877 A1 | 2/2017 | Salino | |
| 2018/0335494 A1* | 11/2018 | Hakimuddin | G01R 33/46 |
| 2018/0356552 A1 | 12/2018 | Li et al. | |
| 2019/0285767 A1 | 9/2019 | Li et al. | |

OTHER PUBLICATIONS

Freedman, R. and Heaton, N., 2004. Fluid characterization using nuclear magnetic resonance logging. Petrophysics, 45(03). (Year: 2004).*
International Search Report and Written Opinion from PCT/US2018/019182, dated Jun. 8, 2018, 12 pages.
PCT Application Serial No. PCT/US2018/019182, International Preliminary Report on Patentability, dated Oct. 10, 2019, 11 pages.

* cited by examiner

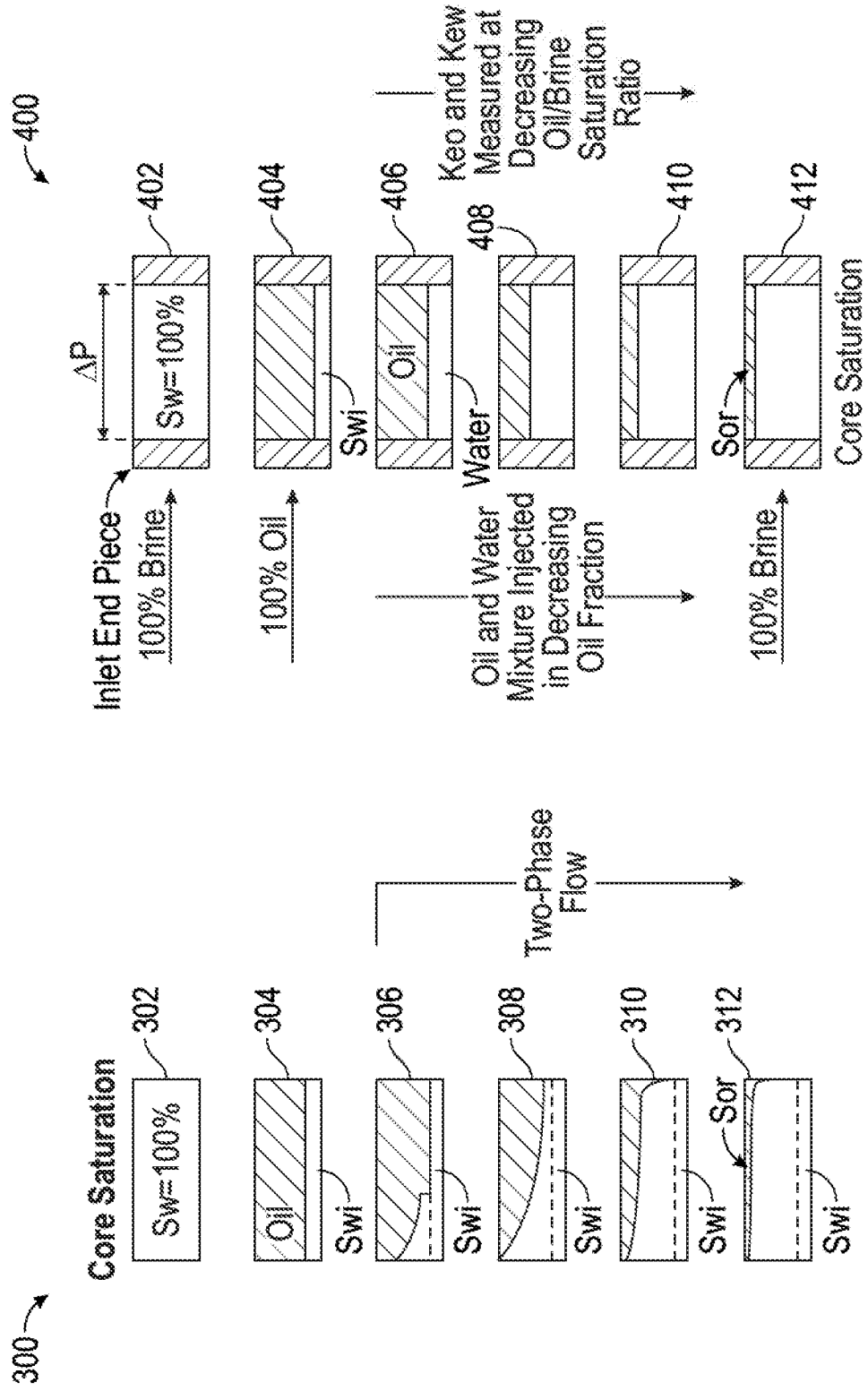

DOWNHOLE, REAL-TIME DETERMINATION OF RELATIVE PERMEABILITY WITH NUCLEAR MAGNETIC RESONANCE AND FORMATION TESTING MEASUREMENTS

CROSS-REFERENCE TO RELATED APPLICATIONS

The present application claims the benefit of priority from U.S. Provisional Application No. 62/480,328, entitled "DOWNHOLE, REAL-TIME DETERMINATION OF RELATIVE PERMEABILITY WITH NUCLEAR MAGNETIC RESONANCE AND FORMATION TESTING MEASUREMENTS," filed on Mar. 31, 2017, the entirety of which is incorporated herein by reference.

TECHNICAL FIELD

The present description relates in general to downhole measurement systems, and more particularly to, for example, without limitation, downhole, real-time determination of relative permeability with nuclear magnetic resonance and formation testing measurements.

BACKGROUND

Reservoir relative permeability as a function of saturation is critical to assess reservoir hydrocarbon recovery rate, to select the well completion method, and to determine the production strategy. It is a key input to reservoir simulator for predicting lifetime production of a well. Relative permeability is traditionally determined from core analysis, which is very time consuming and costly. Because of the lengthy time needed to conduct the core analysis, it is often only practical to be assessed for exploration wells. However, because relative permeability usually varies significantly within a reservoir, relying on limited exploration well assessment is insufficient for heterogeneous reservoirs. Moreover, the procedures for obtaining relative permeability from laboratory core analysis requires core cleaning and re-saturation, a procedure that often resulted in altering wettability, pore structure, and fluid phases. Thus relative permeability by core analysis experiments sometimes are conducted at conditions substantially different from the in-situ conditions, and the exact differences in these conditions are not easily measurable. Therefore, often it has been found that the reservoir production prediction based on the relative permeability derived from core analysis is inconsistent to the actual production data.

BRIEF DESCRIPTION OF THE DRAWINGS

FIG. 3 illustrates a schematic diagram of an example of unsteady state water flooding experiments for relative permeability measurements.

FIG. 4 illustrates a schematic diagram of an example of steady state water flooding experiments for relative permeability measurements.

Figure 1:
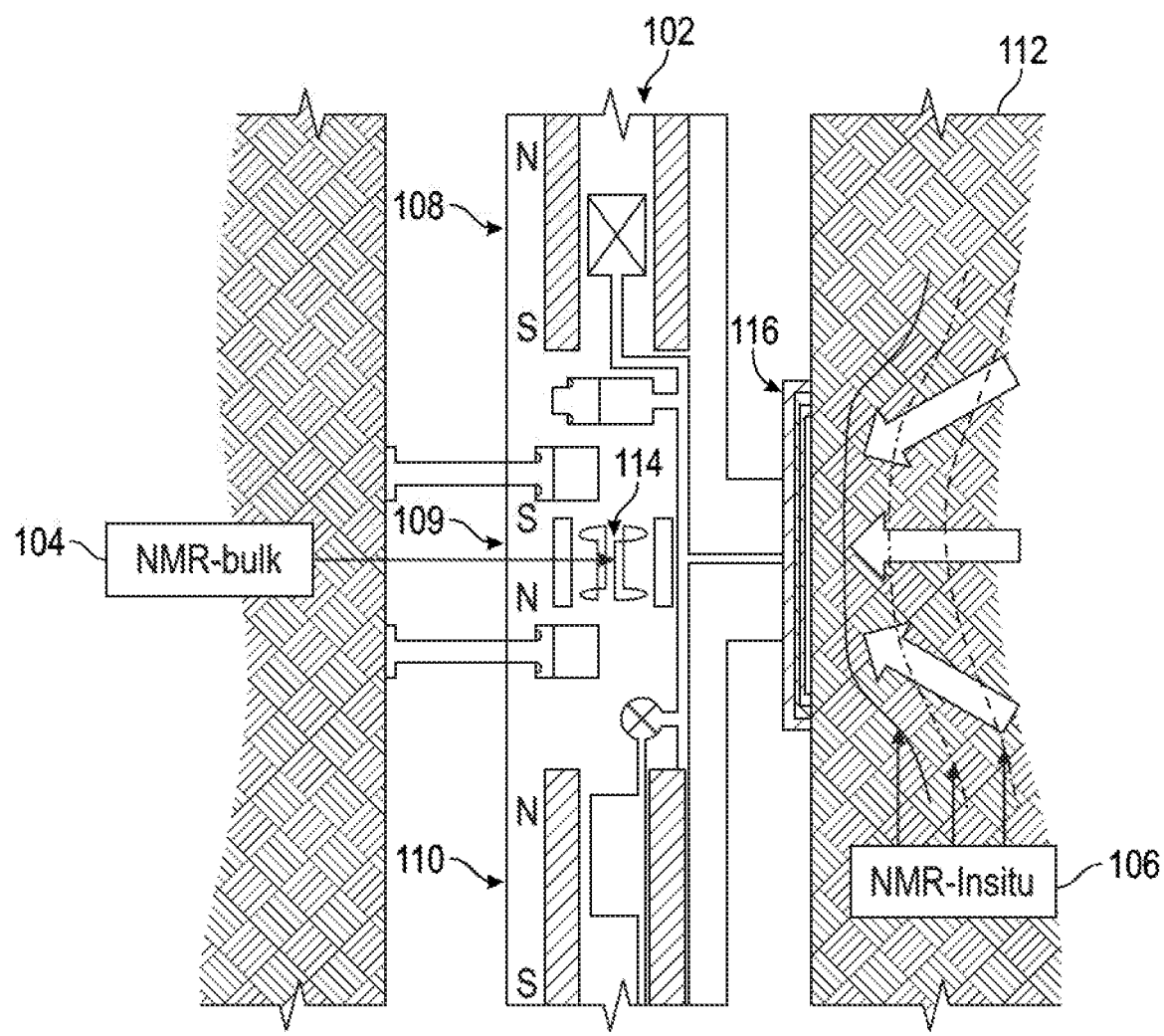
FIG. 1 illustrates a schematic diagram of a dual-zone NMR sensor implemented on a formation testing tool.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The nuclear magnetic resonance (NMR) methods described herein may be performed with logging-while-drilling (LWD) NMR tools, measurement-while-drilling (MWD) NMR tools, wireline NMR tools, slickline NMR tools, and the like.

In view of the traditional systems for measuring reservoir relative permeability, it is desirable to conduct real-time, relative permeability measurements downhole and at logging stage, i.e., before the well completion decision is made. In some aspects, a real-time relative permeability method using wireline formation testing data can be used. The method involves formation testing at multiple depths in a reservoir over water-bearing, oil-bearing, and transition zones, respectively, and other wireline logging data, such as resistivity or NMR logging, are used for saturation determination at the corresponding depths. While this method may be adequate for well-connected, relatively uniform reservoir, it may not be adequate for thin-reservoirs or for heterogeneous reservoirs. Moreover, variation of hydrocarbon fluid properties over the depths of the reservoir can also be a source of error in relative permeability determination with this method. The most desired method should be able to determine the relative permeability using all measurements obtained at a same close vicinity spot of the reservoir, without the requirement of assuming uniform rock, hydrocarbon, and water properties.

In other aspects, a dual-zone NMR sensor configuration integrated with a formation testing tool body can be used. The dual-zone NMR sensor configuration teaches, conceptually, of using NMR measurements at various different pumping or injection rate, to obtain relative permeability.

The subject technology is directed to the combination of an NMR tool and a formation testing tool to provide relative permeability for each depth such that the subject technology does not necessarily rely on reservoir homogeneity assumption for downhole relative permeability estimation. The subject technology focuses on the methodology that uses NMR response of bulk fluid measurements and insitu (e.g., inside formation) multiple-depths-of-investigation fluid responses, as well as formation testing data, to obtain hydrocarbon viscosity, formation pressure, mobility, and hydrocarbon and water saturation, and describe the operation procedures of conducting measurements at various fluid states, and from which to derive relative permeability. The subject technology uses pressure transient analysis of fall-off or buildup tests to determine the fluid permeability as a function of fluid saturation and consequently calculate the relative permeability.

FIG. 1 illustrates a schematic diagram of a dual-zone NMR sensor (e.g., 104, 106) implemented on a formation testing tool 102. In FIG. 1, a magnet assembly, illustrated in three sections (e.g., 108, 109, 110), are used to generate a longitudinal (axial) static magnetic field B0 within the tool body and a gradient magnetic field inside the formation (e.g., 112). One RF coil (e.g., 114), such as the saddle coil illustrated in FIG. 1, is implemented inside the tool body, which, when energized, generates an RF field B1 in the transverse direction. A sample chamber, either as part of the flow line, or a bypass of the flow line, or an over flow collection container, is positioned inside the saddle coil for bulk fluid NMR measurement. A second coil (e.g., 116), illustrated as being implemented on a pad of the formation testing tool 102, when energized, generates transverse B1 field inside the formation 112. The B0 field strength is dependent on the distance from the magnet and monotonically decreases with the distance. As the NMR resonance frequency is proportional to the field strength, multiple depths of investigation (DOI) can be selected with the tune of the frequencies. The inside formation NMR measurements in labeled as NMR-insitu in FIG. 1 (e.g., 106). The multiple DOI NMR measurements are used for assessing unsteady state saturation responses that are important for relative permeability measurements.

An alternative approach suitable for the current application is to implement an NMR sensor on a straddle packer. In this approach, the system can inject into and pump out fluid from the formation more uniformly.

Figure 2:
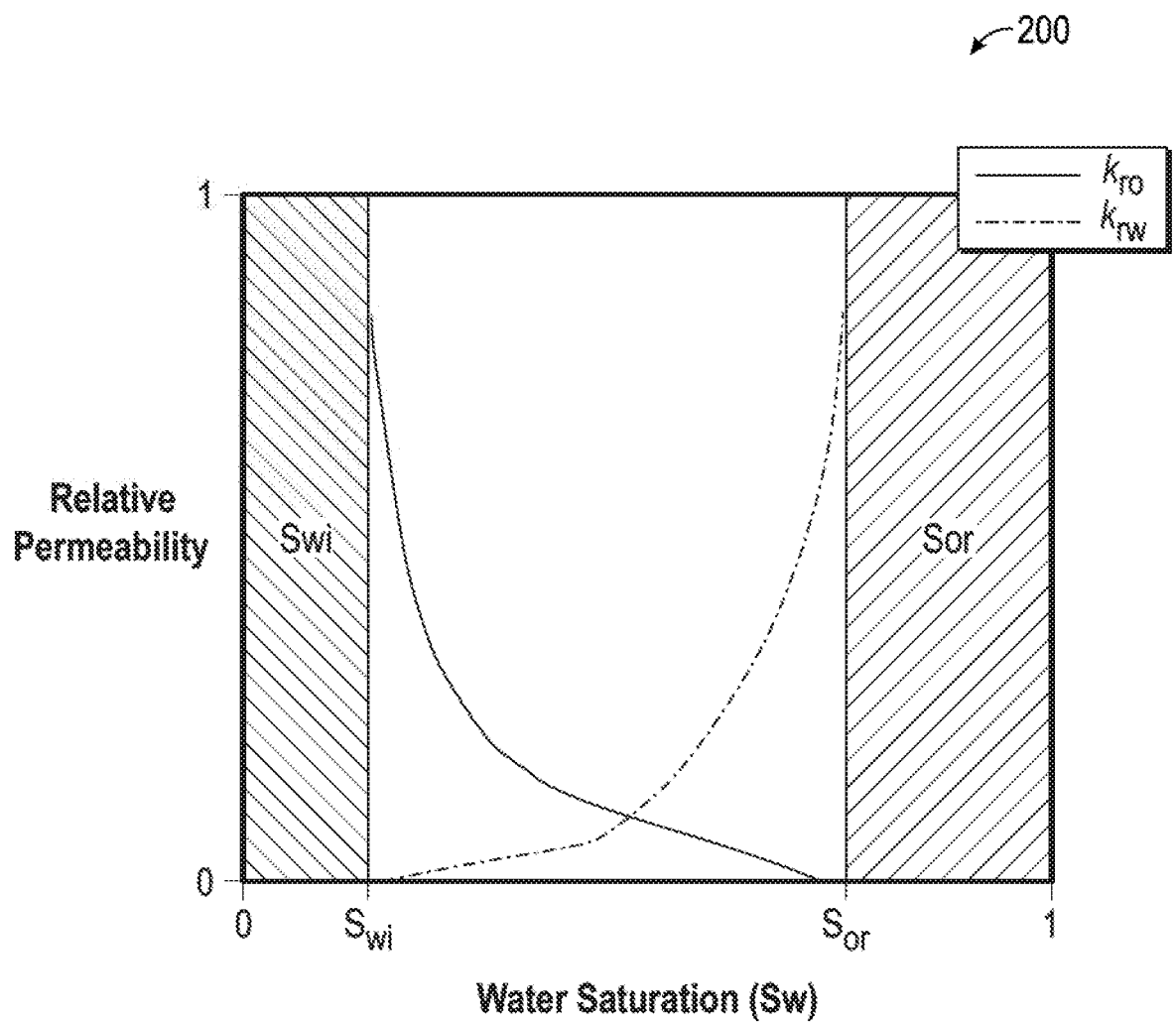
FIG. 2 illustrates a plot depicting a relationship between relative permeability and water saturation.

FIG. 2 illustrates a plot 200 depicting a relationship between relative permeability and water saturation. Relative permeability is defined as the ratio of the effective permeability of a fluid phase (water, oil, or gas) and the base permeability. The choice of base permeability is treated as a scaling parameter thus which method to determine its value is non-critical as long as it is consistent for all fluid states. The relative permeability is dependent of water saturation, thus measurements at multiple fluid saturation states are required in order to obtain relative permeability-water saturation curves such as that illustrated in FIG. 2.

In laboratory relative permeability experiments, water saturation is often obtained with either unsteady state core plug flooding experiments such as that illustrated in FIG. 3 or steady state water flooding experiments, as illustrated in FIG. 4.

FIG. 3 illustrates a flowchart diagram 300 of an example of unsteady gate water flooding experiments for relative permeability measurements. During the unsteady state experiments and before water breakthrough, the water saturation varies along the length of the core. After the breakthrough, water saturation gradually increases until reaching $S_{or}$.

In FIG. 3, at step 302, a brine saturated core is provided, and the brine permeability, Kw, is measured. Next, at step 304, a flood down to Swi with oil event occurs, where the oil permeability at Swi is measured (e.g., Ko@Swi). Subsequently, at step 306, the initial stages of water flood as part of a two-stage flow occurs where only oil is produced, which occurs before any water breakthrough. In this respect, the effective permeability of water and oil are measured (e.g., Kew, Keo). At step 308, during a water breakthrough to trigger a water flood, the effective permeability of water and oil are measured. Next, at step 310, as the water flood continues, both oil and water are produced. In this respect, the effective permeability of water and oil are still measured. Subsequently, at step 312, at the end of the water flood, only water is produced and residual oil saturation is present. In this step, the brine permeability at Sor is measured (e.g., Kw@Sor).

FIG. 4 illustrates a flowchart diagram 400 of an example of steady state water flooding experiments for relative permeability measurements. During steady state experiments, varying mixture of hydrocarbon and water is injected to obtain the different oil/brine saturation state.

In FIG. 4, at step 402, a first type of fluid, such as brine water, is introduced to the inlet end piece. In this step, the brine permeability (e.g., Kw) is measured. Next, at step 404, a second type of fluid, such as oil, is introduced to the inlet end piece, where the oil permeability at Swi is measured (e.g., Ko@Swi). Subsequently, at step 406, a mixture of oil and water is injected in decreasing oil fraction, where the amount of oil introduced is greater than the amount of water. Next, at step 408, the oil and water mixture injected changes such that the amount of water corresponds to the amount of oil introduced. In this respect, further measurements at the decreasing oil/brine saturation ratio are performed. Subsequently, at step 410, the oil and water mixture injected further changes such that the amount of water becomes greater than the amount of oil introduced. Next, at step 412, a brine saturated core is obtained, where residual oil saturation is still present. In this respect, the brine permeability at Sor is measured (e.g., KW@Sor).

In some aspects, another approach of varying water saturation is applying various different water injection pressures (or, equivalently, different water flow rate). For example, as the pressure increases, water saturation level increases.

Referring back to FIG. 1, a formation tester instrument (e.g., 102) used in the subject disclosure has the capabilities of fluid flow in both ways for extracting (pumping) fluids from the near wellbore formation (e.g., 112) or injecting a designated fluid or fluid mixtures from the tool into the formation rock (e.g., 112) to affect the fluid saturation in the vicinity of the borehole. With the addition of the NMR-bulk sensor (e.g., 104) on the formation testing tool 102, the NMR-insitu sensor (e.g., 106) monitors the fluid saturations inside the formation 112 at various stages of the formation testing operation. The NMR-bulk sensor 104 measures the fluids extracted from the formation 112 during a pumping process, or the injecting fluids during an injection process.

Specifically, the NMR-bulk fluid measurement includes relaxation time(s) measurements (e.g., T1 and/or T2), or diffusivity (D) measurement, or a combination of relaxation time and diffusion measurement to obtain 1D (one-dimensional), 2D (two-dimensional), or 3D (three-dimensional) NMR fluid responses, from which, fluids can be discriminated using NMR response contract among the fluids. In one or more implementations, viscosity values of the fluids are determined using bulk fluid NMR relaxation time-viscosity correlation and/or diffusivity-viscosity correlation, or using neural network methods through training from known sample properties.

The NMR-situ sensor 106 measures saturations of fluid phases inside the formation 112 in the vicinity of the formation 112 where pumping or injection affects the saturations. In one or more implementations, the measurements yield 1D (T1, T2, or diffusivity), 2D (a combination of two of the three parameters: T1, T2 and or 3D (T1, T2, and diffusivity). The data acquisition and processing methods for obtaining 1D, 2D, and 3D may use traditional techniques. Using either of the 1D, 2D, or 3D NMR measurements, volumetric of each of the fluids in the rock can be determined by integrating the hydrogen index corrected signal intensity corresponding to the individual fluids, respectively. The fluid phase saturation is determined by the corresponding fluid volume divided by the total fluid volume.

An exemplary procedure is described below for collecting saturation data at various states. In one or more implementations, for water-based mud drilled wells, the initial fluid saturation state in the vicinity of the wellbore is the flushed zone saturation, meaning oil saturation is reduced to the residual oil saturation level corresponding to the pressure difference between borehole and formation. Hereby denoted as $S_{OR}@\Delta P_{BH \rightarrow formation}$. In one or more implementations, the water saturation is reduced to the residual water saturation level by oil-based-mud-filtrate (OBMF).

At the end of the pumping (extraction) process, in an oil-bearing depth, the water-based-mud-filtrate (WBMF) has been pumped out, thus the water saturation reduces to irreducible water saturation, $S_{wi}$. If the testing depth is in a transition zone, the end of pumping state corresponds to a saturation substantially similar to the unflushed zone water and hydrocarbon saturations. The decision to stop pumping for reaching this steady state is determined by observing that the NMR-based oil saturation value asymptotically reaching a plateau (i.e., oil saturation no longer increases with increasing pumping time).

Unsteady state water saturation can be determined with the NMR-insitu sensor measurement set to the multi-DOI mode to record the saturation values at different depths of investigation (DOI), during injection. At least one but preferably more than one designated flow rate is used in the experiments. A low flow rate is used to allow slow penetration of injected fluid thereby contract between saturation at various DOIs are prominent. The unsteady-state measurements are often used for low-permeability rocks. The unsteady state saturation data is used alone or together with steady state measurements.

Steady state injection with multiple flow rates are used to reach steady state $S_{or}$ as function of flow rate, with NMR-insitu sensor 106 to monitor the saturations at various stages.

The maximum injection rate corresponding to the reservoir production fluid injection rate is used for obtaining $S_{or}$ or substantially to the injection rate that is planned for reservoir production.

In one or more implementations, formation mobility tests (such as that obtained with the formation testing tool 102) are conducted at the substantially same time (meaning the same state) as the NMR saturation experiments are conducted. In one or more implementations, the formation mobility is measured from one or more of a micro-buildup process or a micro-falloff process.

Measuring the mobility can occur during the injection or pump-out period. In one or more implementations, during the injection with a constant rate (e.g., water into oil zone), intermediate shut-in tests are performed (pump will be stalled) for small fall-off (build-down) tests. Analyzing these pressure build-downs provides mobility versus water saturation.

In one or more implementations, during the pump-out with a constant rate (e.g., withdrawing water from oil zone), intermediate shut-in tests are performed (pump will be stalled) for small build-up tests. Analyzing these pressure build-ups provides mobility versus water saturation.

To gain more confidence (or higher accuracy) on the measured relative permeability, the injection and pump-out procedures can be repeated over an arbitrary number of iterations.

Mobility measurements from the formation testing tool 102 and viscosity measurements from the NMR bulk sensor 104 are used to obtain permeability at each of the measurement states. In one or more implementations, viscosity is obtained and/or cross-validated with pressure, temperature, saturation, and fluid density measurements. In other implementations, viscosity is obtained by other means such as tuning fork. In one or more implementations, NMR saturations and the permeabilities determined at any given fluid saturation states are used to obtain a relative permeability curve for each selected depth. In some aspects, the viscosity of the fluid is measured concurrently with the measuring of the mobility of the fluid.

The relative permeability determined from the above-mentioned procedure (e.g., injection test) may be referred to as imbibition (water displacing oil assuming a water wet rock) relative permeability curves. Similarly, if the above saturation measurement process is obtained during the pumping process, the relative permeability curve obtained thereafter is a drainage relative permeability curve.

In one or more implementations, the combined NMR and formation testing measurements for relative permeability determination is used to assess the production variation at different depths of a reservoir. Formation rock heterogeneity, oil GOR (Gas/Oil Ratio) and viscosity variation, and the wettability heterogeneity could all affect the relative permeability within a reservoir. Since all measurements in the subject disclosure is based on the same depth, the same experiments can be conducted for each depths of interest.

In one or more implementations, the combined NMR and formation testing measurements for relative permeability determination is used to assess the efficiency of different EOR (Enhanced Oil Recovery)/IOR (Improved Oil Recovery) injection fluids for oil production. The subject disclosure is suitable for such application by conducting the same experiments in two adequately separated depths of the same reservoir having similar formation properties (such as porosity, pore size distribution, density, mineralogy, etc), with two differently designed production enhancement fluids (e.g., smart water), respectively; and the comparison of the relative permeability curves from these two sets of relative permeability curves will make it possible to choose the better EOR/IOR fluids at an optimal injection flow rate.

In one or more implementations, the combined NMR and formation testing measurements for relative permeability curves (or measurements) is used to assess additional production potential with secondary or subsequent forced imbibition after the primary forced imbibition reaches production goal. The subject disclosure provides such information. In one depth of interest within the reservoir, one EOR/IOR fluid is used for downhole experiments following the procedure described above. Once it reaches the maximum oil production, the second fluid type is used to repeat the experiments, and NMR saturation measurements are used to observe additional decrease of $S_{or}$. For instance, the primary imbibition injection fluid may be a smart water, and the second imbibition injection fluid may be a polymer.

In one or more implementations, the combined NMR and formation testing measurements for relative permeability determination is used to obtain the effectiveness of reducing the water cut rate with an injected fluid. This is achieved by injecting a relaxation time-enhancing agent-doped water-plugging fluid into the formation, with real-time multi-DOI NMR monitoring to obtain T1 and/or T2 distributions before, during, and after injection. If the initial state is the water-based mud filtrate flushed state, the comparison of the flushed state relaxation time distribution with that during and after injection determines which sizes of pores are being plugged thereby it is possible to estimate the water-cut reduction efficiency at downhole condition.

Figure 5:
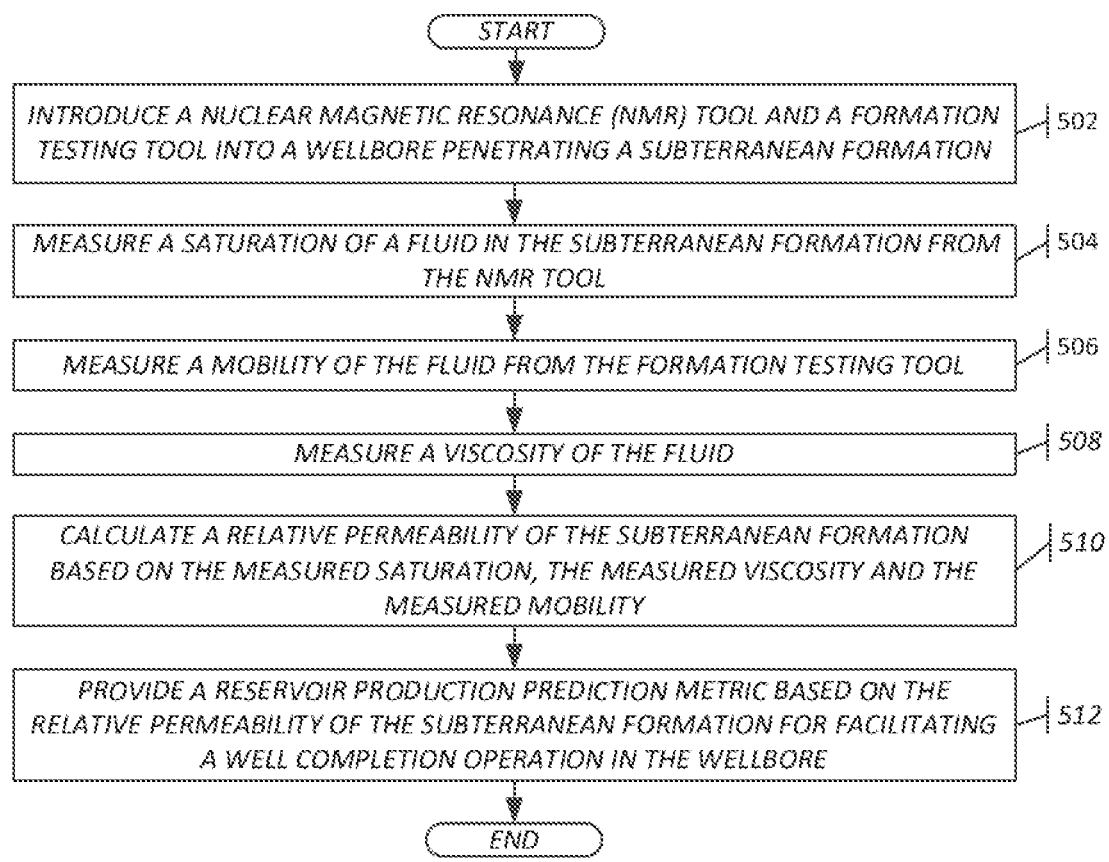
FIG. 5 illustrates a flowchart of a process for downhole, real-time determination of relative permeability with NMR and formation testing measurements in accordance with one or more implementations of the subject technology.

FIG. 5 illustrates a flowchart of a process 500 for employing an electrohydraulic quick union for subsea landing string in accordance with one or more implementations of the subject technology. Further for explanatory purposes, the blocks of the sequential process 500 are described herein as occurring in serial, or linearly. However, multiple blocks of the process 500 may occur in parallel. In addition, the blocks of the process 500 need not be performed in the order shown and/or one or more of the blocks of the process 500 need not be performed.

The process 500 starts at step 502, where a nuclear magnetic (NMR) tool and a formation testing tool are introduced into a wellbore penetrating a subterranean formation. Next, at step 504, a saturation of a fluid in the subterranean formation is measured from the NMR tool. Subsequently, at step 506, a mobility of the fluid is measured from the formation testing tool. Next, at step 508, a viscosity of the fluid is measured. Subsequently, at step 510, a relative permeability of the subterranean formation is calculated based on the measured saturation, the measured viscosity and the measured mobility. Next, at step 512, a reservoir production prediction metric is provided based on the relative permeability of the subterranean formation for facilitating a well completion operation in the wellbore.

In some aspects, the process 500 includes a step for drilling the wellbore, in which the NMR tool is a logging-while-drilling (LWD) NMR tool. In other aspects, the process 500 includes a step for generating an axial static magnetic field within a body of the formation testing tool and a gradient magnetic field inside the subterranean formation with a magnet assembly in the formation testing tool. In some aspects, the process 500 includes steps for energizing a first radio frequency (RF) coil of the NMR tool that is arranged in a body of the formation testing tool, generating a first magnetic field in a transverse direction with the energized first RF coil, energizing a second RF coil of the NA IR tool that is arranged on a pad of the formation testing tool, and generating a second magnetic field in the transverse direction inside the subterranean formation with the energized second RF coil.

In some implementations, the process 500 includes a step for monitoring fluid saturations at one or more zones in the subterranean formation using the NMR tool. In some implementations, the saturation is measured from one or more steady state measurements. In other implementations, the saturation is measured from one or more unsteady state measurements.

In monitoring the fluid saturations, the process 500 includes a step for measuring fluids in the subterranean formation during a pumping period or injecting fluids inserted into the subterranean formation during an injection period using die NMR tool.

In some implementations, in measuring the viscosity, the process 500 includes steps for measuring bulk properties of the fluid using the NMR tool, and obtaining viscosity information from one or more of correlations or neural network processes using information obtained from predetermined sample properties. In some aspects, the viscosity of the fluid is measured concurrently with the measuring of the mobility of the fluid.

In some implementations, in measuring the mobility, the process 500 includes a step for determining a rate of change in formation pressure during a pumping period or an injection period. In calculating the relative permeability, the process 500 includes a step for calculating a different relative permeability for each different depth within the wellbore. In some aspects, the relative permeability is calculated based on the saturation, the viscosity and the mobility measured at a same depth within the wellbore.

In some implementations, the process 500 includes steps for measuring fluid density of one or more different fluids in the subterranean formation, calculating a fractional flow rate of the one or more different fluids, and determining an effective permeability of a fluid phase with respect to the one or more different fluids. In other implementations, the process 500 includes a step for measuring a formation mobility from one or more of a micro-buildup process or a micro-falloff process.

Figure 6:
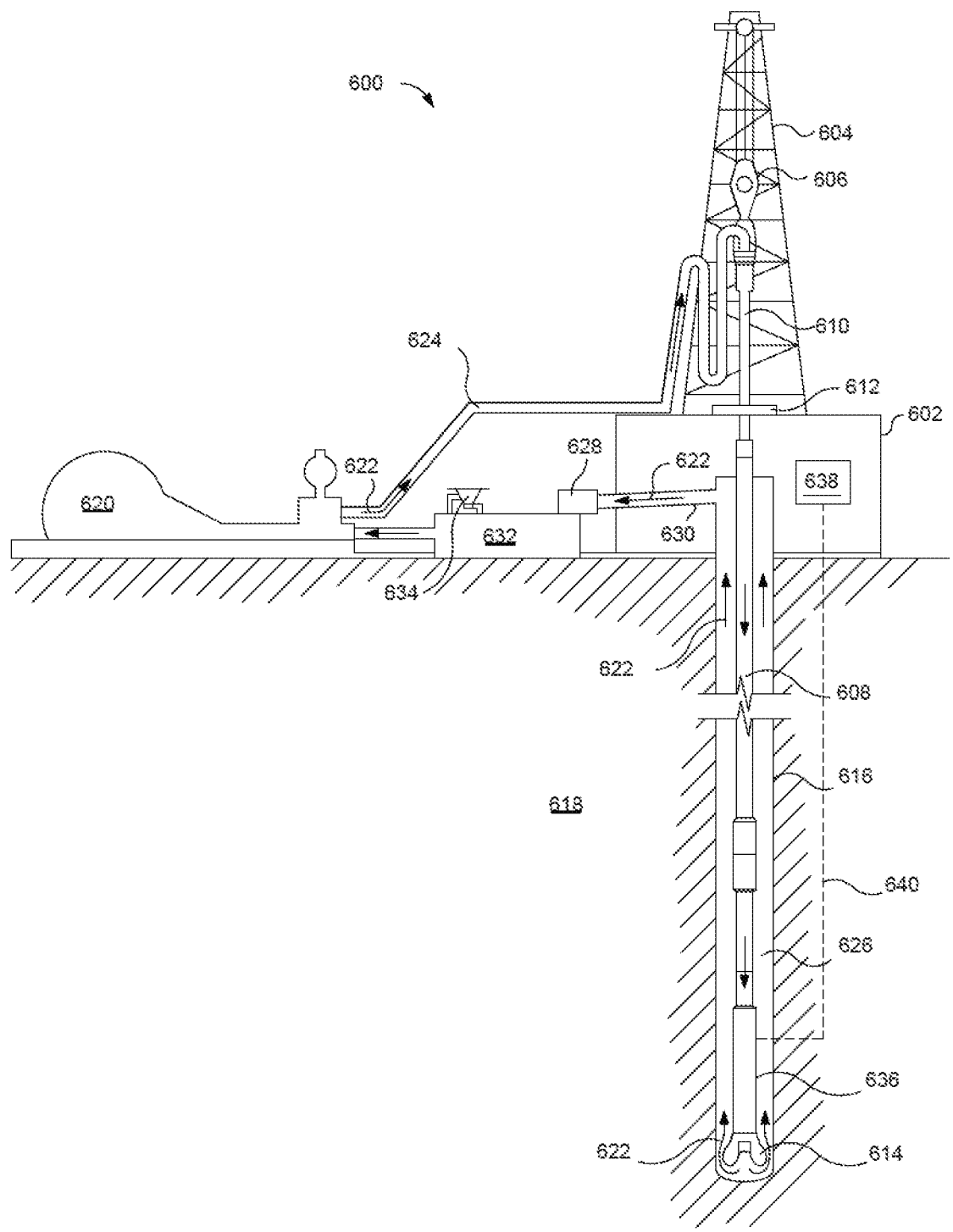
FIG. 6 illustrates an exemplary drilling assembly for implementing the NMR analysis methods described herein.

FIG. 6 illustrates an exemplary drilling assembly 600 for implementing the NMR analysis methods described herein. It should be noted that while FIG. 6 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 600 may include a drilling platform 602 that supports a derrick 604 having a traveling block 606 for raising and lowering a drill string 608. The drill string 608 may include, but is not limited to, drill pipe and coiled tubing, as generally known to those skilled in the art. A kelly 610 supports the drill string 608 as it is lowered through a rotary table 612. A drill bit 614 is attached to the distal end of the drill string 608 and is driven either by a downhole motor and/or via rotation of the drill string 608 from the well surface. As the bit 614 rotates, it creates a wellbore 616 that penetrates various subterranean formations 618. Along the drill string 608 logging while drilling (LWD) or measurement while drilling (MWD) equipment 636 is included.

In the present application, the LWD/MWD equipment 636 may be capable of NMR analysis of the subterranean formation 618 proximal to the wellbore 616. The LWD/MWD equipment 636 may transmit the measured data to a processor 638 at the surface wired or wirelessly. Transmission of the data is generally illustrated at line 640 to demonstrate communicable coupling between the processor 638 and the LWD/MWD equipment 636 and does not necessarily indicate the path to which communication is achieved.

A pump 620 (e.g., a mud pump) circulates drilling mud 622 through a feed pipe 624 and to the kelly 610, which conveys the drilling mud 622 downhole through the interior of the drill string 608 and through one or more orifices in the drill bit 614. The drilling mud 622 is then circulated back to the surface via an annulus 626 defined between the drill string 608 and the walls of the wellborn 616. At the surface, the recirculated or spent drilling mud 622 exits the annulus 626 and may be conveyed to one or more fluid processing unit(s) 628 via an interconnecting flow line 630. After passing through the fluid processing unit(s) 628, a "cleaned" drilling mud 622 is deposited into a nearby retention pit 632 (i.e., a mud pit). While illustrated as being arranged at the outlet of the wellbore 616 via the annulus 626, those skilled in the art will readily appreciate that the fluid processing unit(s) 628 may be arranged at any other location in the drilling assembly 600 to facilitate its proper function, without departing from the scope of the scope of the disclosure.

Chemicals, fluids, additives, and the like may be added to the drilling mud 622 via a mixing hopper 634 communicably coupled to or otherwise in fluid communication with the retention pit 632. The mixing hopper 634 may include, but is not limited to, mixers and related mixing equipment known to those skilled in the art. In other embodiments, however, the chemicals, fluids, additives, and the like may be added to the drilling mud 622 at any other location in the drilling assembly 600. In at least one embodiment, for example, there could be more than one retention pit 632, such as multiple retention pits 632 in series. Moreover, the retention pit 632 may be representative of one or more fluid storage facilities and/or units where the chemicals, fluids, additives, and the like may be stored, reconditioned, and/or regulated until added to the drilling mud 622.

The processor 638 may be a portion of computer hardware used to implement the various illustrative blocks, modules, elements, components, methods, and algorithms described herein. The processor 638 may be configured to execute one or more sequences of instructions, programming stances, or code stored on a non-transitory, computer-readable medium. The processor 638 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor 638 to perform the process steps described herein. One or more processors 638 in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to the processor 638 for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

In one or more implementations, the drilling assembly 600 involves drilling the wellbore 616 while the NMR measurements are made with the LWD/MWD equipment 636. More generally, the methods described herein involve introducing an NMR tool into the wellbore where the NMR tool may be an LWD NMR tool, a MWD NMR tool, a wireline NMR tool, slickline NMR tool, and the like. In one or more implementations, the NMR tool is integrated with a formation testing tool such that both tools are introduced into the wellbore. In some aspects, a reservoir production prediction metric is provided to the drilling assembly 600 based on the relative permeability of the subterranean formation for facilitating a well completion operation in the wellbore 616.

Figure 7:
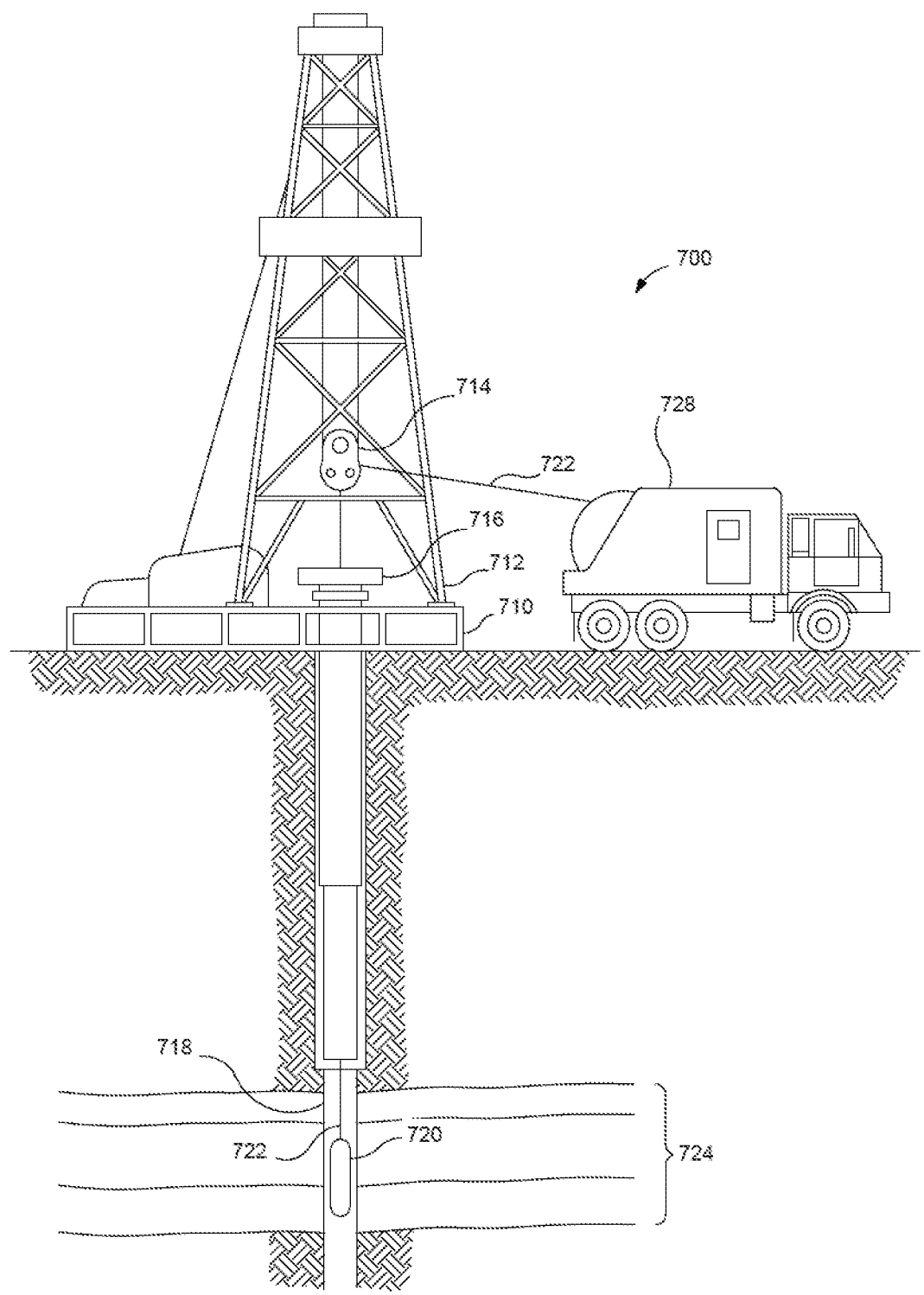
FIG. 7 illustrates a wireline system suitable for implementing the NMR analysis methods described herein.

FIG. 7, for example, illustrates a logging assembly 700 having a wireline system suitable for implementing the NMR analysis methods described herein. As illustrated, a platform 710 may be equipped with a derrick 712 that supports a hoist 714. Drilling oil and gas wells, for example, are commonly carried out using a string of drill pipes connected together so as to form a drilling string that is lowered through a rotary table 716 into a wellbore 718. Here, it is assumed that the drilling string has been temporarily removed from the wellbore 718 to allow an NMR tool 720 to be lowered by wireline 722, slickline, or logging other cable into the wellbore 718. Typically, the NMR tool 720 is lowered to a region of interest and subsequently pulled upward at a substantially constant speed. During the upward trip, instruments included in the NMR tool 720 may be used to perform measurements on the subterranean formation 724 adjacent the wellbore 718 as the NMR tool 720 passes by. In some aspects, a reservoir production prediction metric is provided to the logging assembly 700 based on the relative permeability of the subterranean formation for facilitating a well completion operation in the wellbore 718.

The NMR relaxation data may be communicated to a logging facility 728 for storage, processing, and analysis. The logging facility 728 may be provided with electronic equipment for various types of signal processing including a control system or processor similar to processor 638 of FIG. 6 for performing the NMR analysis methods described herein.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

Various examples of aspects of the disclosure are described below. These are provided as examples, and do not limit the subject technology.

A method of downhole, real-time determination of relative permeability with nuclear magnetic resonance and formation testing measurements is provided. The method includes introducing a nuclear magnetic (NMR) tool and a formation testing tool into a wellbore penetrating a subterranean formation. The method includes measuring a saturation of a fluid in the subterranean formation from the NMR tool. The method includes measuring a mobility of the fluid from the formation testing tool. The method includes measuring a viscosity of the fluid. The method includes calculating a relative permeability of the subterranean formation based on the measured saturation, the measured viscosity and the measured mobility. The method also includes providing a reservoir production prediction metric based on the relative permeability of the subterranean formation for facilitating a well completion operation in the wellbore.

In some aspects, the method includes drilling the wellbore, wherein the NMR tool is a logging-while-drilling (LWD) NMR tool.

In some aspects, the method includes monitoring fluid saturations at one or more zones in the subterranean formation using the NMR tool.

In monitoring the fluid saturations, the method includes measuring fluids in the subterranean formation during a pumping period or injecting fluids inserted into the subterranean formation dining an injection period using the NMR tool.

In measuring the viscosity, the method includes measuring bulk properties of the fluid using the NMR tool, and obtaining viscosity information from one or more of correlations or neural network processes using information obtained from predetermined sample properties.

In measuring the mobility, the method includes determining a rate of change in formation pressure during a pumping period or an injection period.

In some aspects, the viscosity of the fluid is measured concurrently with the measuring of the mobility of the fluid.

In some aspects, the relative permeability is calculated based on the saturation, the viscosity and the mobility measured at a same depth within the wellbore.

In calculating the relative permeability, the method includes calculating a different relative permeability for each different depth within the wellbore.

In some aspects, the method includes measuring fluid density of one or more different fluids in the subterranean formation, calculating a fractional flow rate of the one or more different fluids, and determining an effective permeability of a fluid phase with respect to the one or more different fluids.

In some aspects, the method includes measuring a formation mobility from one or more of a micro-buildup process or a micro-falloff process.

In some aspects, the saturation is measured from one or more steady state measurements. In other aspects, the saturation is measured from one or more unsteady state measurements.

In some aspects, the method includes generating an axial static magnetic field within a body of the formation testing tool and a gradient magnetic field inside the subterranean formation with a magnet assembly in the formation testing tool.

In some aspects, the method includes energizing a first radio frequency (RF) coil of the NMR tool that is arranged in a body of the formation testing tool, generating a first magnetic field in a transverse direction with the energized first RF coil, energizing a second RF coil of the NMR tool that is arranged on a pad of the formation testing tool, and generating a second magnetic field in the transverse direction inside the subterranean formation with the energized second RF coil.

A system for downhole, real-time determination of relative permeability with nuclear magnetic resonance and formation testing measurements is provided. The system includes a nuclear magnetic resonance (NMR) tool, a formation testing tool, a processing unit, and a memory communicably coupled to the NMR tool and to the formation testing tool. In some aspects, the memory stores instructions that, when executed by the processing unit, cause the processing unit to measure a saturation of a fluid in a subterranean formation from the NMR tool, measure a mobility of the fluid from the formation testing tool, measure a viscosity of the fluid, calculate a relative permeability of the subterranean formation based on the measured saturation, the measured viscosity and the measured mobility, and provide a reservoir production prediction metric based on the relative permeability of the subterranean formation for facilitating a well completion operation in a wellbore penetrating the subterranean formation.

In some aspects, the formation testing tool includes a magnet assembly positioned along a longitudinal axis of the formation testing tool, in which the magnet assembly is configured to generate an axial static magnetic field within a body of the formation testing tool and a gradient magnetic field inside the subterranean formation.

In some aspects, a field strength of the axial static magnetic field is dependent on a distance from the magnet assembly and monotonically decreases with the distance, in which an NMR resonance frequency is proportional to the field strength, and the instructions further cause the processing unit to select one or more saturation measurements from the NMR tool at different depths with a tune of corresponding NMR frequencies.

In some aspects, the NMR tool includes a first ratio frequency (RF) coil and a second RF coil, the first RF coil being arranged in a body of the formation testing tool and the second RF coil being arranged on a pad of the formation testing tool, in which the first RF coil is energized to generate a first magnetic field in a transverse direction and the second RF coil is energized to generate a second magnetic field in the transverse direction inside the subterranean formation.

In some aspects, the NMR tool comprises a sample chamber positioned inside the first RF coil for measuring bulk properties of the fluid.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims we intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced at the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the infinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with specification should be adopted.

What is claimed is:

1. A method comprising:
   introducing a nuclear magnetic resonance (NMR) tool and a formation testing tool into a wellbore penetrating a subterranean formation;
   measuring a saturation of a fluid in the subterranean formation from the NMR tool;
   measuring a mobility of the fluid from the formation testing tool;
   measuring a viscosity of the fluid;
   calculating a relative permeability of the subterranean formation based on the measured saturation, the measured viscosity and the measured mobility; and
   providing a reservoir production prediction metric based on the relative permeability of the subterranean formation for facilitating a well completion operation in the wellbore.

2. The method of claim 1, further comprising:
   drilling the wellbore, wherein the NMR tool is a logging-while-drilling (LWD) NMR tool.

3. The method of claim 1, further comprising:
monitoring fluid saturations at one or more zones in the subterranean formation using the NMR tool.

4. The method of claim 3, wherein monitoring the fluid saturations comprises:
measuring fluids in the subterranean formation during a pumping period or injecting fluids inserted into the subterranean formation during an injection period using the NMR tool.

5. The method of claim 1, wherein measuring the viscosity comprises:
measuring bulk properties of the fluid using the NMR tool; and
obtaining viscosity information from one or more of correlations or neural network processes using information obtained from predetermined sample properties.

6. The method of claim 1, wherein measuring the mobility comprises:
determining a rate of change in formation pressure during a pumping period or an injection period.

7. The method of claim 1, wherein the viscosity of the fluid is measured concurrently with the measuring of the mobility of the fluid.

8. The method of claim 1, wherein the relative permeability is calculated based on the saturation, the viscosity and the mobility measured at a same depth within the wellbore.

9. The method of claim 1, wherein calculating the relative permeability comprises:
calculating a different relative permeability for each different depth within the wellbore.

10. The method of claim 1, further comprising:
measuring fluid density of one or more different fluids in the subterranean formation;
calculating a fractional flow rate of the one or more different fluids; and
determining an effective permeability of a fluid phase with respect to the one or more different fluids.

11. The method of claim 1, further comprising:
measuring a formation mobility from one or more of a micro-buildup process or a micro-falloff process.

12. The method of claim 1, wherein the saturation is measured from one or more steady state measurements.

13. The method of claim 1, wherein the saturation is measured from one or more unsteady state measurements.

14. The method of claim 1, further comprising:
generating an axial static magnetic field within a body of the formation testing tool and a gradient magnetic field inside the subterranean formation with a magnet assembly in the formation testing tool.

15. The method of claim 1, further comprising:
energizing a first radio frequency (RF) coil of the NMR tool that is arranged in a body of the formation testing tool;
generating a first magnetic field in a transverse direction with the energized first RF coil;
energizing a second RF coil of the NMR tool that is arranged on a pad of the formation testing tool; and
generating a second magnetic field in the transverse direction inside the subterranean formation with the energized second RF coil.

16. A system comprising:
a nuclear magnetic resonance (NMR) tool;
a formation testing tool;
a processing unit; and
a memory communicably coupled to the NMR tool and to the formation testing tool, wherein the memory stores instructions that, when executed by the processing unit, cause the processing unit to:
measure a saturation of a fluid in a subterranean formation from the NMR tool;
measure a mobility of the fluid from the formation testing tool;
measure a viscosity of the fluid;
calculate a relative permeability of the subterranean formation based on the measured saturation, the measured viscosity and the measured mobility; and
providing a reservoir production prediction metric based on the relative permeability of the subterranean formation for facilitating a well completion operation in a wellbore penetrating the subterranean formation.

17. The system of claim 16, wherein the formation testing tool comprises a magnet assembly positioned along a longitudinal axis of the formation testing tool, wherein the magnet assembly is configured to generate an axial static magnetic field within a body of the formation testing tool and a gradient magnetic field inside the subterranean formation.

18. The system of claim 17, wherein a field strength of the axial static magnetic field is dependent on a distance from the magnet assembly and monotonically decreases with the distance, wherein an NMR resonance frequency is proportional to the field strength, and wherein the instructions further cause the processing unit to select one or more saturation measurements from the NMR tool at different depths with a tune of corresponding NMR frequencies.

19. The system of claim 16, wherein the NMR tool comprises a first radio frequency (RF) coil and a second RF coil, the first RF coil being arranged in a body of the formation testing tool and the second RF coil being arranged on a pad of the formation testing tool, wherein the first RF coil is energized to generate a first magnetic field in a transverse direction and the second RF coil is energized to generate a second magnetic field in the transverse direction inside the subterranean formation.

20. The system of claim 19, wherein the NMR tool comprises a sample chamber positioned inside the first RF coil for measuring bulk properties of the fluid.

* * * * *